United States Patent
Cooper et al.

(10) Patent No.: US 7,403,900 B2
(45) Date of Patent: *Jul. 22, 2008

(54) FRANKING SYSTEM AND METHOD

(75) Inventors: Gordon C. Cooper, Toronto (CA); Todd Teal, Fort Erie (CA); Richard H. Cooper, Kleinburg (CA)

(73) Assignee: Global Sensor Systems, Inc, Mississauga, Ontario (CA)

( * ) Notice: Subject to any disclaimer, the term of this patent is extended or adjusted under 35 U.S.C. 154(b) by 39 days.

This patent is subject to a terminal disclaimer.

(21) Appl. No.: 10/532,435

(22) PCT Filed: May 30, 2003

(86) PCT No.: PCT/CA03/00810

§ 371 (c)(1),
(2), (4) Date: Sep. 2, 2005

(87) PCT Pub. No.: WO03/102501

PCT Pub. Date: Dec. 11, 2003

(65) Prior Publication Data

US 2006/0020476 A1 Jan. 26, 2006

(30) Foreign Application Priority Data

Jun. 4, 2002 (CA) ................................ 2388895
May 20, 2003 (CA) ................................ 2429248

(51) Int. Cl.
*G06Q 99/00* (2006.01)
*G01B 5/04* (2006.01)

(52) U.S. Cl. .......................................... 705/1; 702/159

(58) Field of Classification Search ................... 705/1; 702/156, 159
See application file for complete search history.

(56) References Cited

U.S. PATENT DOCUMENTS 2,708,368 A 5/1955 Kolisch
4,417,817 A 11/1983 Bohme et al.

(Continued)

OTHER PUBLICATIONS

Hartman, Lauren R., Robot shows dexterity in palletizing, Aug. 2000, Packaging Digest, vol. 37, No. p; p. 40 (printout pp. 1-6).*

(Continued)

*Primary Examiner*—Jamisue Plucinski
(74) *Attorney, Agent, or Firm*—Vidas, Arrett & Steinkraus (57) ABSTRACT

A billing system for determining package transportation charges. The billing system includes a reader to read a package identifier associated with said package and the reader generates a package identifier signal and transmits the same to a microprocessor. The billing system also includes a package sizer having a plurality of non-contact optical sensors located along each of an x, y and z axis, where each optical sensor is in a known position. The sensors are oriented relative to the conveyor so that packages passing over the sensors are detected by the sensors and produce a signal correlated to said package size. Also provided is a microprocessor to receive and correlate said package size and identifier signals, and to determine an appropriate shipping charge based upon the same. A weigh scale may also be incorporated into the system. A method of determining a transportation charge is also comprehended, which includes a selfdiagnostic initialization procedure.

16 Claims, 11 Drawing Sheets

U.S. PATENT DOCUMENTS

| | | | |
|---|---|---|---|
| 4,773,029 A | 9/1988 | Claesson et al. |
| 5,042,015 A | 8/1991 | Stringer |
| 5,469,262 A | 11/1995 | Keen et al. |
| 5,535,127 A | 7/1996 | Uno et al. |
| 5,734,476 A | 3/1998 | Dlugos |
| 5,770,864 A | 6/1998 | Dlugos |
| 5,777,746 A | 7/1998 | Dlugos |
| 5,793,652 A | 8/1998 | DeBarber et al. |
| 5,808,912 A | 9/1998 | Dlugos et al. |
| 5,815,274 A | 9/1998 | Dlugos |
| 5,841,541 A | 11/1998 | Dlugos |
| 5,850,370 A | 12/1998 | Stringer et al. |
| 5,878,379 A | 3/1999 | Dlugos et al. |
| 5,909,013 A | 6/1999 | Dlugos |
| 5,914,463 A | 6/1999 | Dlugos |
| 5,914,464 A | 6/1999 | Vogel |
| 6,064,629 A | 5/2000 | Stringer et al. |
| 6,105,014 A | 8/2000 | Ramsden et al. |
| 6,189,223 B1 | 2/2001 | Haug |
| 6,201,604 B1 | 3/2001 | Harris et al. |
| 6,611,787 B2 | 8/2003 | Stringer et al. |
| 2001/0034608 A1 | 10/2001 | Gendreau |

OTHER PUBLICATIONS

New Technology, advancements shine at CastExpo '02, Jun. 1, 2002, American Foundrymen's Society, Inc. Modern Casting No. 6, vol. 92, p. 68. (printout pp. 1-2).*

* cited by examiner

FRANKING SYSTEM AND METHOD

CROSS-REFERENCE TO RELATED APPLICATIONS

This application is a national stage filing under 35 USC 371 from PCT/CA03/00810, filed May 30, 2003 which claims priority from the following applications: Canadian application no. 2,388,895, filed Jun. 4, 2002; and Canadian application no. 2,429,248, filed May 20, 2003.

FIELD OF THE INVENTION

This invention relates generally to the transportation of packages for a fee. More particularly, this invention relates to devices and methods used to determine an appropriate fee for transporting a package based on the size, weight or other parameters of the package.

BACKGROUND OF THE INVENTION

Many courier companies offer to pick up and deliver packages on behalf of their customers. In exchange for delivering the packages to the customer's specified destination, the courier company charges a fee. Typically the fee is based upon one or more of the size of the package, the weight of the package, the destination of the package and the urgency of the packages' delivery. Larger courier companies typically have a central sorting station. At the central sorting station packages picked up from customers are processed for delivery to the customer's specified destination.

A problem exists in determining the appropriate charge for the customer to delivery the package. In some cases, the volume of the package is the limiting constraint, especially for goods shipped by overnight air carrier. In other circumstances, the packages' weight can be the limiting factor again for example, when being shipped by air carrier. What is needed is a way of measuring a package to evaluate the appropriate shipping charge for the customer.

In the past several attempts have been made to develop such measuring devices. For example, U.S. Pat. Nos. 5,469,262 and 6,201,604 provide non-destructive remote volume measuring of packages using light beams. However, the sensing mechanisms involved are complex and expensive. This renders such devices beyond the reach of all but large courier companies.

U.S. Pat. No. 2,708,368 presents a less expensive alternative, which involves a person who places the package on an electronic measuring grid. The worker pushes the package against the grid, where it contacts trip switches. The switches are located on an x, y and z axes and a size measurement is obtained by measuring, in effect, how many switches are tripped, by direct contact between the package and the switches along each axis. However, such direct contact measuring is unreliable since most packages to be shipped are made from flexible packaging material, such as cardboard. Such flexible packaging material can soften or deform under impact and any number of switches along a packages length may not be tripped yielding a false (low) reading. Further, physical contact trip switches involve moving parts which can wear out over time, which can get gummed up and stick in an on or off position by dirt, debris or the like, and which are otherwise expensive to maintain and operate. Further, the need for a person to orient the package on the grid for measurement is expensive. Lastly, there is no way to detect whether the volume measured is at all accurate.

What is needed is a simple and reliable system for measuring the volume of a package, commonly known as "cubing" a package, and for weighing a package to determine an appropriate shipping charge.

SUMMARY OF THE INVENTION

The present invention provides a billing system for determining the transportation charges for packages. Most preferably the present invention provides an optical sensor based non-contact reading system for dimensioning or cubing the package. According to the present invention the outer dimensions of the package can be measured, without requiring physical contact or tripping of multiple switches on multiple sensing axes. Further, the present invention is simple, inexpensive and in one embodiment may be used on a continuous motorized conveyor without the need for an attendant. The present invention also provides a way to confirm the measured or detected volume makes sense. Another aspect of the present invention is to provide a reader for the purpose of reading a unique package identifier associated with each package. In this way, the measured size of the package can be correlated to a package identifier in a database for billing purposes.

The present invention further comprehends a microprocessor which receives the sensor values, determines a cubing size, receives the package identifier information and correlates this with the size information and determines an appropriate billing rate based on input destination and urgency.

In a further embodiment, an associated weigh scale is provided for in-line measurement of packaging weight which information is also provided electronically to the microprocessor so it can then also be correlated to the unique identifier and the package volume in the microprocessor database. The present invention further comprehends a screen to display the measured size and/or weight to permit the operator, if any, to review the data for obvious input errors.

Most preferably, the volume sensing (or "cubing") means of the present invention consists of non-contact optical sensors, for example, phototransistors which have a change in electrical signal output according with the amount of light impinging on the sensor. By mounting the sensor behind a transparent cover below or behind the package path along the conveyor, the present invention provides a dimension measuring device which is simple and inexpensive to fabricate and easy and reliable to use.

Therefore, according to one aspect of the present invention there is provided a billing system for determining transportation charges for packages movable along a conveyor, said billing system comprising:

a reader to read a package identifier associated with said package, said reader generating a package identification signal and transmitting the signal to a microprocessor;

a package sizer having a plurality of spaced non-contact optical sensors being positioned on at last an y and a z axis for measuring a height and a width of a package, and a means for measuring a length of said package, each optical sensor being located at a known position and oriented relative to said conveyor so that packages passing past said sizer are detected by said optical sensors, said sizer determining a size of said package; and a microprocessor to receive and correlate said package identification signal and said package size for billing purposes, said microprocessor including pre-input data on billing charges, whereby said measured package size can be compared to said pre-input data to determine a transportation charge for said package.

According to another aspect of the invention, there is provided a method of determining transportation charges for packages by using a billing system having non-contact optical sensors, said method comprising the steps of:

identifying a package by means of a reader;

passing the package past sensors located in a y and z axis and measuring a length of said package on an x axis;

determining a volume of said package from said sensor readings and said length of said package;

measuring a weight of the package;

correlating the package identifier with said measured weight and volume of said package in a database;

displaying the measured weight and volume; and determining a charge for said package based upon said measured weight and volume upon acceptance of the displayed package parameters.

BRIEF DESCRIPTION OF THE DRAWINGS

Reference will now be made to drawings, which illustrate, by way of example only, preferred embodiments of the present invention and in which.

DETAILED DESCRIPTION OF THE PREFERRED EMBODIMENTS

Figure 1:
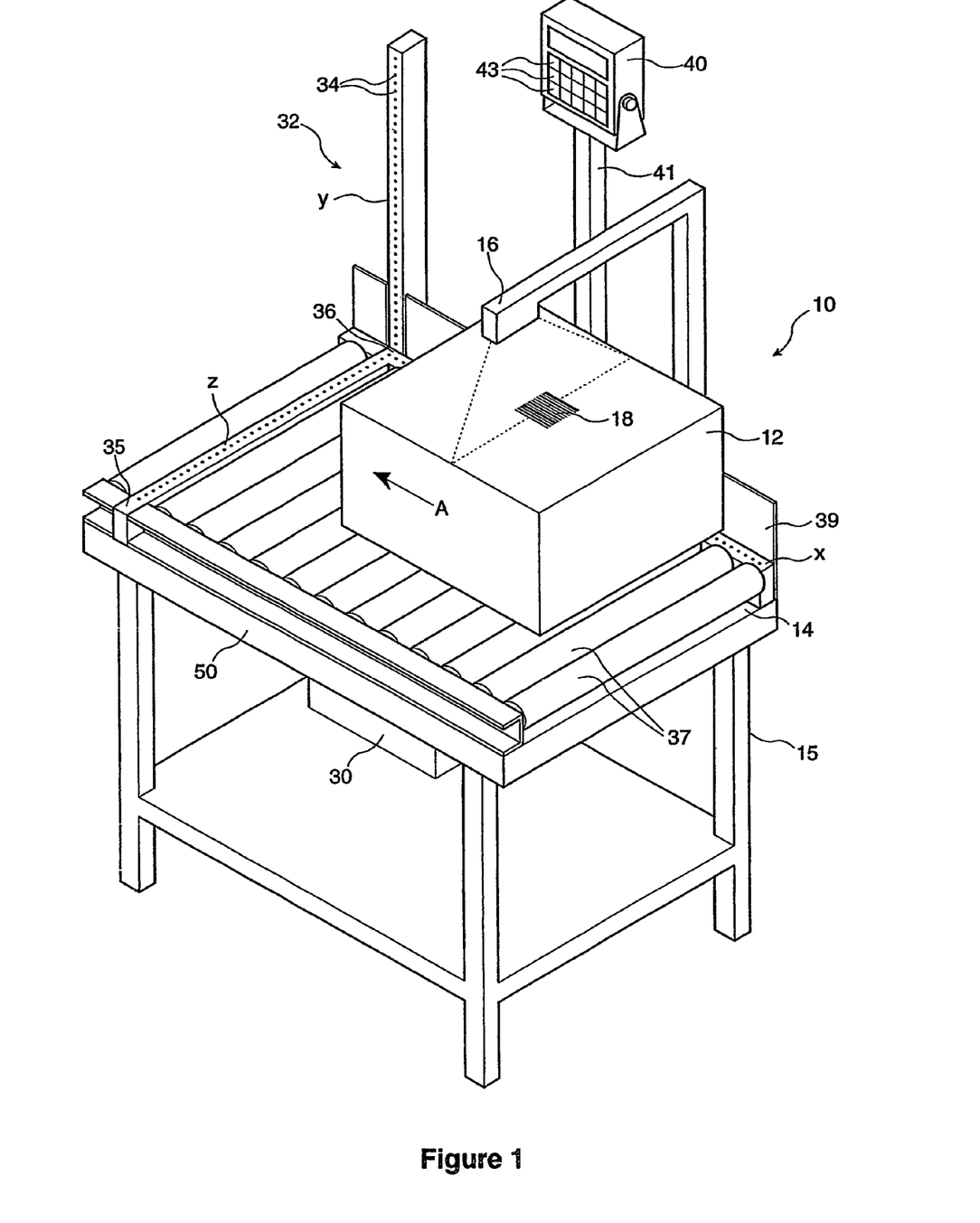
FIG. 1 is a side view of a system according to the present invention.
Figure 2:
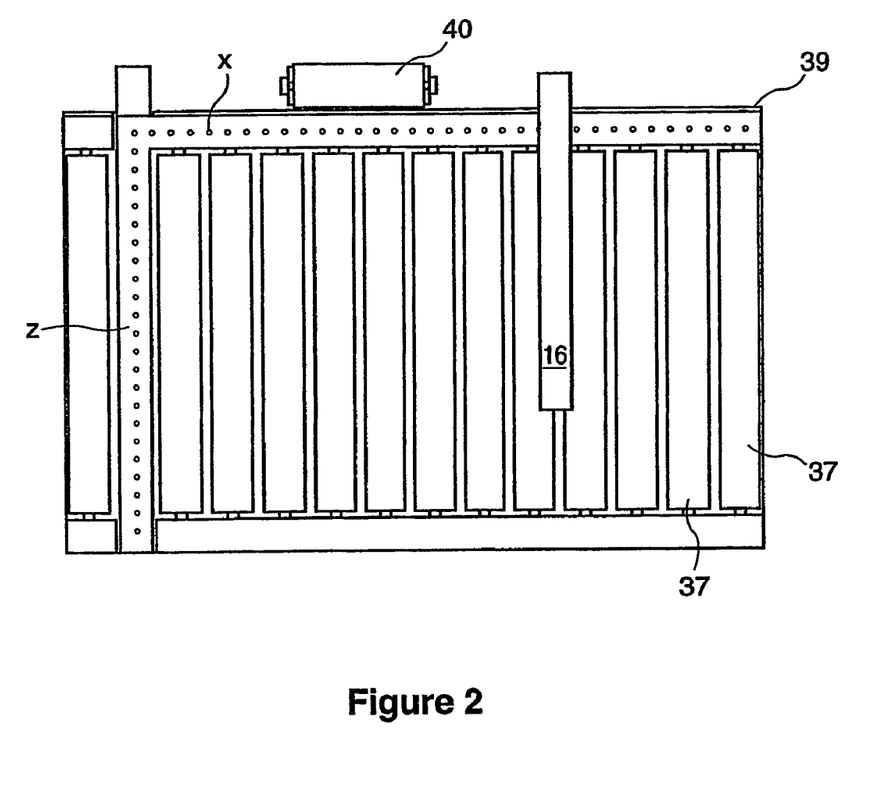
FIG. 2 is a top view of the system of FIG. 1.
Figure 3:
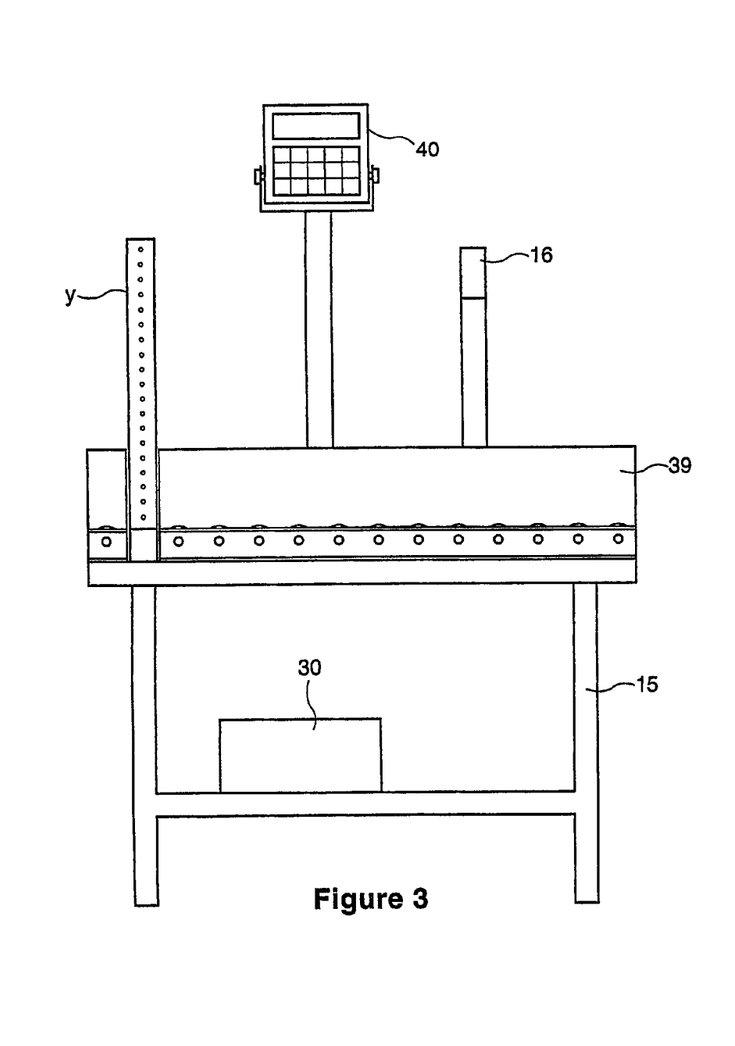
FIG. 3 is a front view of the system of FIG. 1 an optical sensor according to the present invention.
Figure 4:
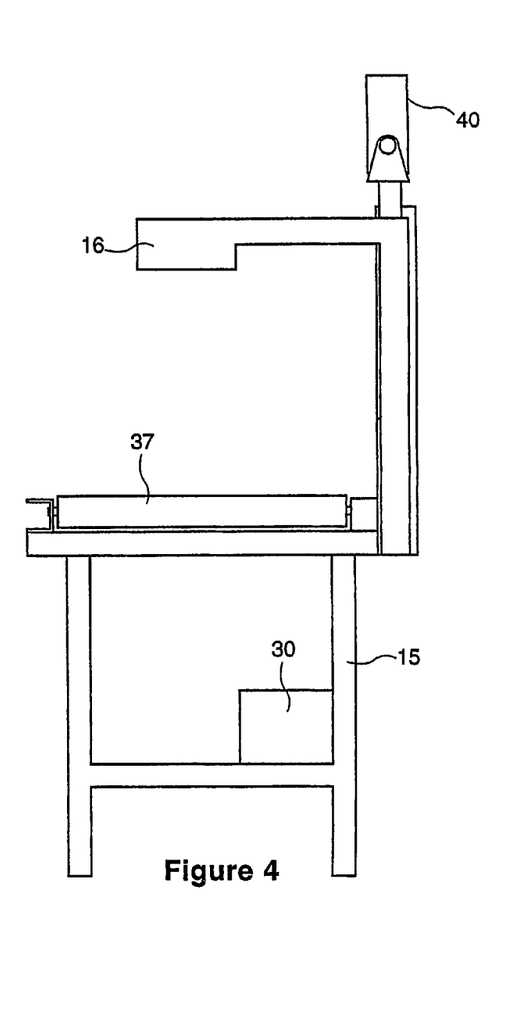
FIG. 4 is an end view of the system of FIG. 1 shows a panel display according to the present invention.

FIG. 1 shows a billing system 10 according to the present invention for determining transportation charges for packages 12 moving along a conveyor 14. As shown, the system 10 is carried on a separate stand 15, which allows the system 10 to function as a stand alone unit. However, the present invention also comprehends building the system 10 into a conveyor line without a separate stand 15.

The billing system 10 includes a reader 16 to read a package identifier 18 on the package 12. It will be understood by those skilled in the art that there are many forms of package identifier 18 and reader 16. For example, the reader 16 may be an optical scanner, and may read a digital bar code identifier on the package which, may for example, be a waybill number. Alternatively, the package may be equipped with a RFID (Radio Frequency Identification Device) tag which may be read by an appropriate RFID tag reader. Other forms of identifiers and readers are comprehended by the present invention, but the optical scanner and bar code tag provide inexpensive and accurate results. Also, while a fixed scanner 16 is shown, a hand held scanner may also be used and is comprehended by the present invention. The output from the reader 16 is a package identification signal, which is electronically communicated to a microprocessor 30.

The next element of the billing system is a package sizer 32 having a plurality of spaced optical sensors 34. In a first embodiment of the present invention, a number of sensors 34 are located along each of an x, y and z axis as shown. Most preferably, the x, y and z axes are perpendicularly oriented relative to the conveyor 14. In this way it is easy to calibrate the signals to package size when the packages passing along the conveyor 14 are detected by the optical sensors. However, the present invention comprehends orienting the axes of optical sensors in any configuration which still provides a reading of a package dimension. Thus, the axes could be skewed, and calibrated, without departing from the scope of the present invention. In this sense calibrated means the positions of individual sensors are known, so that the distance between a fixed point and each sensor is also known.

As can be seen from FIG. 1, the optical sensors 34 are spaced along the axes in the x, y, or z directions. The intersection point of the axes is referred to as the origin 36. In this manner, each optical sensor is at a defined distance from the origin 36. Most preferably, according to the present invention, the optical sensors are in the form of silicon phototransistors such as the SDP Series made by Honeywell. Such phototransistors can detect the change in the amount of light that impinges upon the sensor and thus can sense when an object passes over the sensor. When such a change is detected, an electrical signal is produced. By knowing the position of the sensor producing the signal, the presence of a package at such specific location can be sensed as explained in more detail below.

The preferred optical sensors are non-contact sensors. Such sensors are accurate and sensitive enough to respond to a change in light, caused by an object passing over the sensor. Optionally the optical sensors 34 are protected by a transparent cover 35. Alternatively, the optical sensors can be placed in a non-contact position, just behind a plane defining one side of the package. For example, in the preferred embodiment, the system 10 includes rollers 37 as part of the conveyor 14. The rollers 37 are mounted on bearings (not shown) in the usual manner to permit the packages to be easily moved along the stand 15, first past the reader 16, then past the sizer 32. The packages move in the direction of arrow A in this example, but may move in either direction without departing from the scope of the present invention. The optical sensor can be located as shown between a pair of adjacent rollers, but below the level of the top of the rollers. In this way, the package will pass closely over the sensors, without needing to actually contact the sensor to generate a reading.

The accuracy of the measurement of the sizer 32 will be a function of detecting the outside edges of the package 12. If the sensors 34 are spaced more closely together, a more precise measurement of the outer dimensions of the package 12 can be obtained. Contrarily, if the spacing of the sensors 34 is further apart, then the size of the package 12 is less precisely measured. Placing the sensors 34 at ½ inch intervals has yielded reasonable results, but the present invention comprehends other spacings such as ½ cm or the like. Further, it may be desired not to measure small packages at all, medium packages quite precisely and large packages less precisely. In some cases, packages below a certain size will not be billed according to size as a minimum charge will apply. Thus, in one form of the invention, no sensors 34 would be located adjacent to the origin, sensors quite closely spaced would then follow, and lastly widely spaced sensors would be located on the outermost part of the x, y and z axes.

It can also be desirable to measure the size of small packages, in which case more closely spaced sensors may be used to reduce measurement error. Thus, a preferred form of the present invention is to have closely spaced sensors closest to the origin, such as 1 mm apart for the first 10 cm, and then, further from the origin have more widely spaced sensors, such as every 5 mm. Unlike the prior art which determined a package dimension by summing the outputs of all the tripped switches, the present invention relies upon identifying each sensor 34 and its position. Thus, rather than taking all of the signals, which compounds any errors in reading, the present invention simply utilizes the outermost sensor which generates an output corresponding to a change in the amount of light, as a proxy for the outside edge of the package 12 to determine the package size. In this way the location of the outside edges of any package can be determined. Thus, the sensing errors, if any, are not cumulative to every sensor contacting the package as in the prior art. Further, the present invention will use, as a reading, the last covered sensor 34 of a continuous set of covered sensors 34. Thus, if for some reason one sensor 34 is covered, the next one is uncovered, and then further away from the origin a few more sensors 34 are covered and producing readings, the present invention utilizes only the last one of the set of covered sensors 34 as the measurement point. In this way, stray readings from non-package items such as an operator's hand or any other matter which could cause a false reading will not throw off the accurate measurement of the package.

As can now be appreciated, to accurately sense a size of a package 12 in all three dimensions, x, y and z, requires that the package 12 pass over three sets of calibrated (as to position) sensors 34. Thus it is preferred to cause one corner of the package 12 to momentarily be located at the origin 36, to lie against the x, y and z axes. Thus the package 12 can pass an upright surface 39 in which the y axis is located while at the same time passing over the x and z axes. In such a case, only the outermost width sensor 34, the topmost height sensor 34 and the outermost length sensor 43 need be used. As the position of each sensor is known, taking a reading from any given sensor will provide a package dimension measurement for "cubing" purposes.

Figure 7:
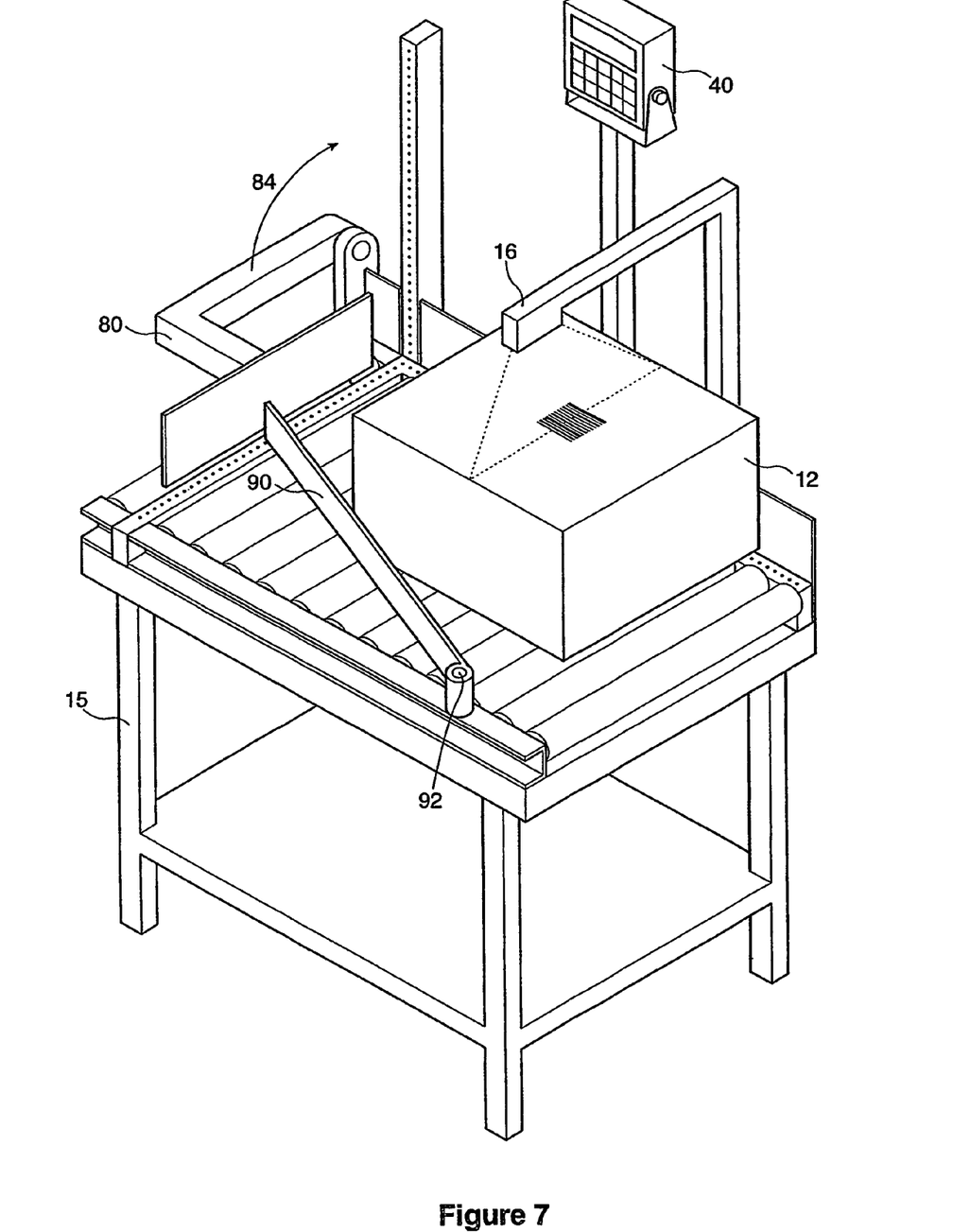
FIG. 7 shows a further embodiment of the present invention.
Figure 8:
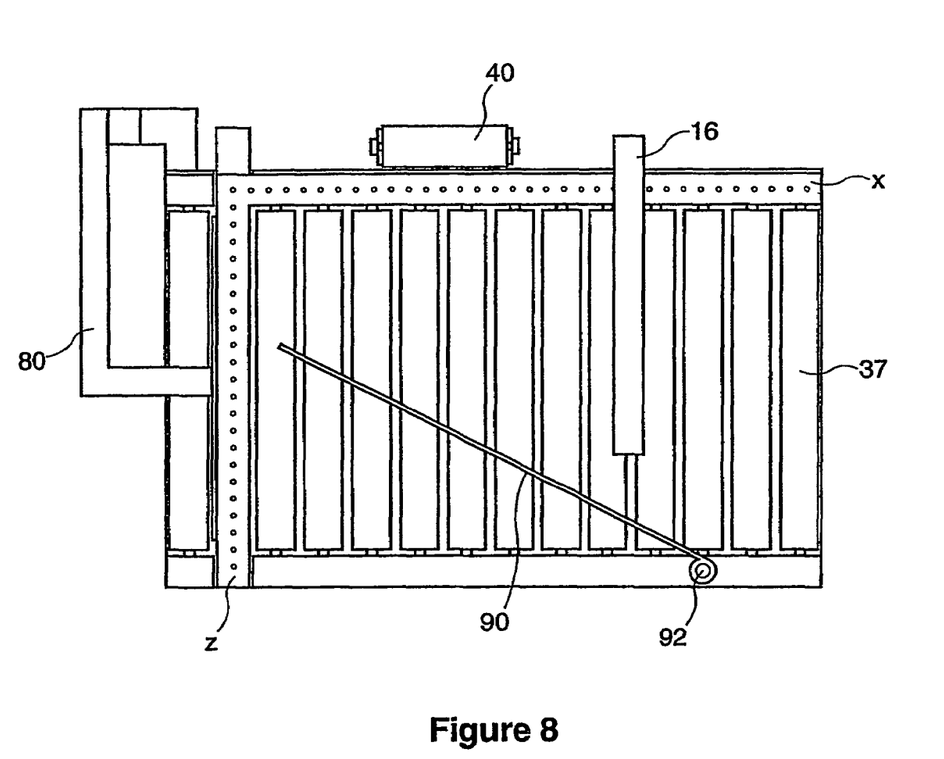
FIG. 8 shows the embodiment of FIG. 7 from above.

For the purpose of obtaining a reading, it is most appropriate to temporarily stop the package 12 on the conveyor 14, and position the package 12 against the measurement axes. In the embodiment of FIGS. 1 to 4, this is done manually by a worker who slides the package into position against wall 39. A fixed stop edge can be provided extending out from the back wall to ensure accurate alignment. In the embodiment of FIGS. 7 and 8, the stop is automatically moved by mechanical means as explained below. Once the package 12 is placed with one corner at the origin 36 a measurement of all three dimensions can be taken. The measurement takes the form of an electronic output signal which is sent to and received by the microprocessor 30. Additionally, the present invention comprehends passing the package over or past a sensing bar, and taking the two outermost readings, rather than using an origin position.

Associated with the microprocessor 30 is a monitor or display 40 as shown in FIG. 1. It may be mounted on a mast 41, and include input buttons 43, which are explained in more detail below. Alternatively it may be mounted at any convenient location where it is easily visible to an operator, such as in front of the scale. The purpose of the monitor 40 is to provide a visual display of the readings made by the system 10. For example, when the package 12 is manually positioned on the measurement axes, the operator can simply observe the measured amount and thereby ensure that the reading is a good reading. Then the operator can release the package to let it continue along the conveyor for destination sorting or the like. An advantage of the present invention which displays the measured parameters is that the operator has an opportunity to check the measurements by eyeballing the actual package 12 size. The estimated value will be arrived at either through the operator's experience, or, through general knowledge. For example, if a one foot by one foot by one foot package is displayed as being 9 cubic feet, the operator will clearly know that a measurement error has occurred and can remove and remeasure the package 12 before a bill is produced for the shipping customer.

Also associated with the conveyor 14 is an inline weigh scale 50 which most preferably is built into the support structure for the sizer system 32. Thus, the present invention comprehends that the weight of the package 12 can be determined, either as the package 12 is moved to the sizer 32, or even while the sizer 32 measurements are being taken. Weight scales from Matrix Scale Service in Mississauga, Ontario have been found to yield reasonable results in providing an output signal which can be converted into a weight reading. The weigh scale can weigh the individual weight of packages 12, and in this fashion both the weight and the volume of a package 12 can be measured and correlated to the package identifier in the microprocessor.

Figure 5:
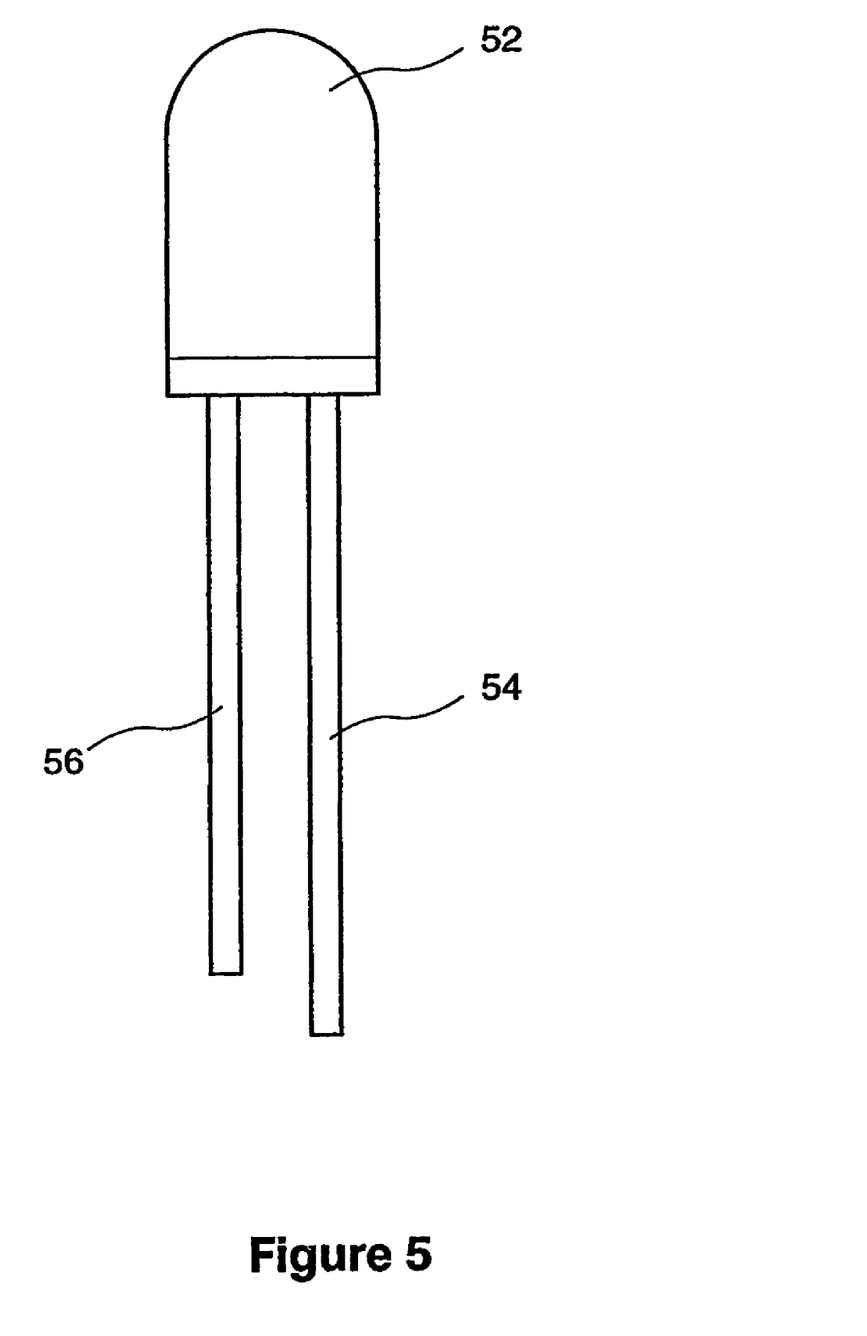
FIG. 5 is a detailed view of an optical sensor according to the present invention.

Turning now to FIG. 5, a side view of an optical sensor, such as a phototransistor is provided. It includes a detection surface 52, and a pair of electrical leads 54, 56. The phototransistor works in a known manner and thus is not described in any more detail herein. Other types of non-contact sensors are comprehended by the present invention, but the phototransistors have provided reasonable results and are thus preferred.

Figure 6:
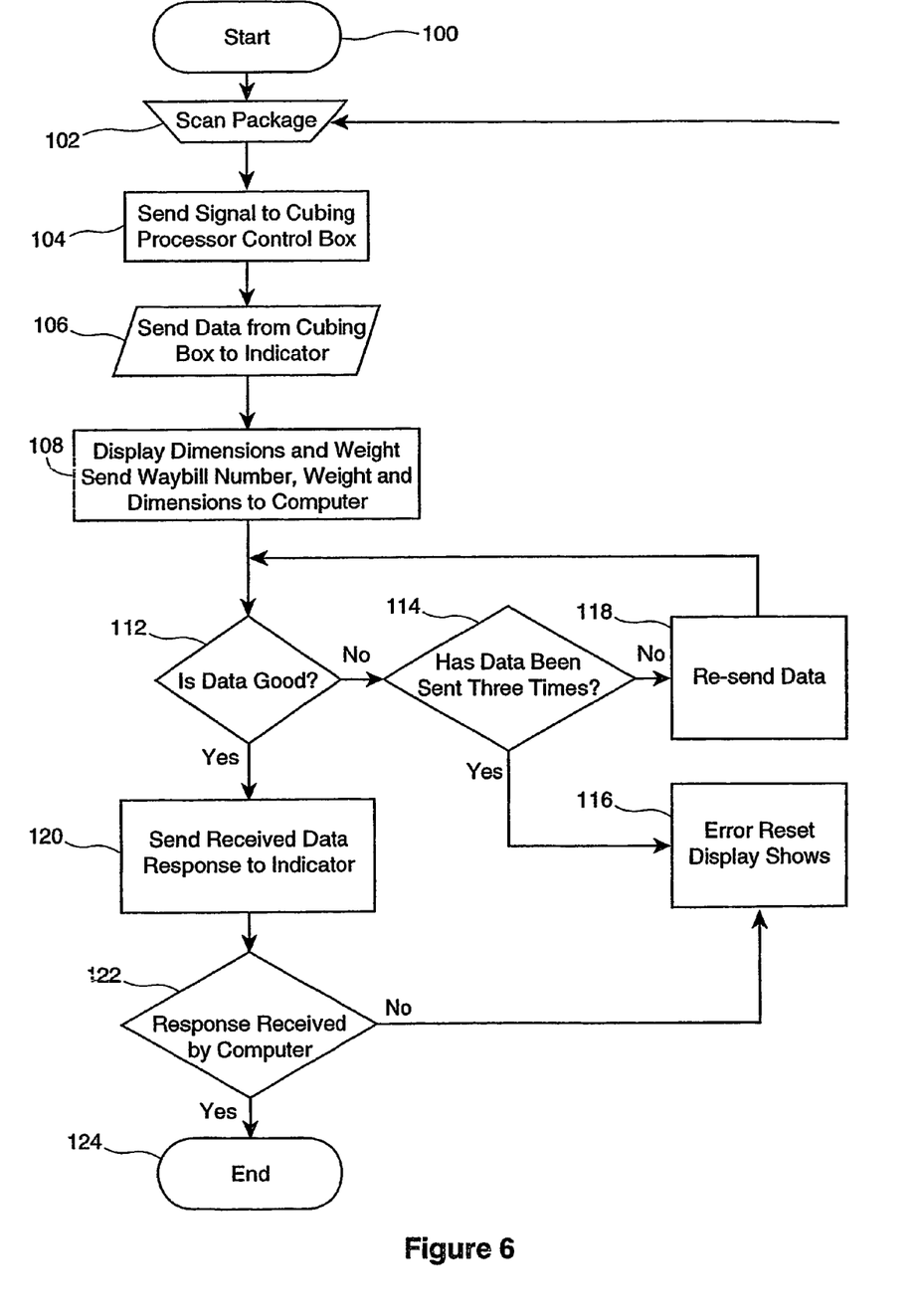
FIG. 6 shows an algorithm for the microprocessor to receive and correlate measured parameters for billing purposes.

Turning now to FIG. 6, an exemplary flow chart for the implementation of a billing system according to the present invention is provided. The first step is a test procedure when the system is first turned on, the microcontroller automatically performs a test to confirm that all of the phototransistors are working, and to verify that the required amount of light is present for the sensors to operate. If a problem is present the display will indicate an error, and that servicing is required. To assist, the display will indicate what the problem is.

The system is then ready for packages, indicated by start 100. The start step may be initiated, for example by the optical reader sensing a package identifier. At the next step 102, the package is scanned. At this point, the scanning takes the form of weighing the package by means of the inline weigh scale 50 incorporated into the support stand 15, and cubing the package with sizer 32, namely, identifying the volume of the package by use of the non-contact optical sensors placed at predetermined positions in the three optical sensing or measurement axes as explained above. Once the readings are made, the information is sent as an electronic signal to a cubing processor control box, which converts the electronic signals into data signals at step 104. Then, at step 106, the data is sent from the cubing process control box to a display or monitor. Then, at step 108, the monitor displays the dimensions, the weight, the waybill number and any other pertinent information for the package. At this point, the information can be viewed by the operator, if any, and generally verified as to its apparent accuracy.

The next step at 112, is to send the verified data to the billing computer (not shown) for the system. The billing computer is responsible for correlating the electronic data to a scale of charges to determine the appropriate waybill charge for the shipping customer. This can be done by look-up table or the like, where pre-input billing charges are provided for specific package sizes or ranges of sizes. Prior to actually producing a waybill, the data is checked to determine whether or not it is good. For example, the computer ensures that the waybill number has the appropriate number of digits, and that the weight and volume that were measured fall within acceptable parameters. If the information is not acceptable, then, the program at step 114 questions whether or not the data has been sent three times. At 116, if the data has already been sent three times and is still not acceptable, then an error message is sent to the display, in which case the package is removed and reinserted into the conveyor belt for remeasuring. If the data has not been sent a predetermined number of times, then at step 118, the data is resent to the microcomputer.

At step 112, if the data is good, then an acknowledgement of received data is sent to the display at 120 so that the operator knows the information has been recorded into the computer database. Once the data has been confirmed as being displayed, then the program ends at 124 and is ready to receive the next package for weighing. If for some reason the data is not displayed at 122, then the program reverts to an error reset and the package must be remeasured back at step 102.

The next stage is to determine the billing charges for the package. There are many different ways for determining the billing charges, and various multipliers can be used for distance, urgency, and weight and/or volume. Having the relevant billing information pre-input into a microprocessor in electronic form means that the microprocessor can generate a bill appropriate to the package volume, weight, destination and urgency.

Turning now to FIG. 7, an automated version of the present invention is shown. The same numbers are used for the same components as appear in the first embodiment. In this version no operator is required, and the conveyor automatically moves the packages along by means of powered rollers or the like. As shown, stop arm 80 is provided which is mounted above the conveyor. The stop arm 80 is preferably actuable between a stop position and a release position in direction of arrow 84. In the stop position, the stop arm 80 causes the package to be restrained against the measurement axis at the origin 36. Upon receiving a valid signal, the microprocessor can then provide an output signal to the stop arm 80 to release the stop arm 80 and let the package continue on its way by pivoting up in direction of arrow 84. In this manner, hands free package measuring can be accomplished.

In many cases it will be necessary to also ensure that the package is placed against the far side of the sizer, to ensure good measurements on the x axis and the y axis of the sizer. Thus, a positioning arm 90 is provided, which pivots about 92. A predetermined torque is used to ensure that packages are pushed laterally against the x and y measurement axes, but the positioning arm 90 will also pivot to let larger packages through. The precise electro-mechanical control of the pivoting arm 90 can vary, as will be understood by those skilled in the art. What this embodiment of the present invention comprehends, is an automatic means to position the package momentarily on the sensing grid to permit the appropriate measurements to be made.

Figure 9:
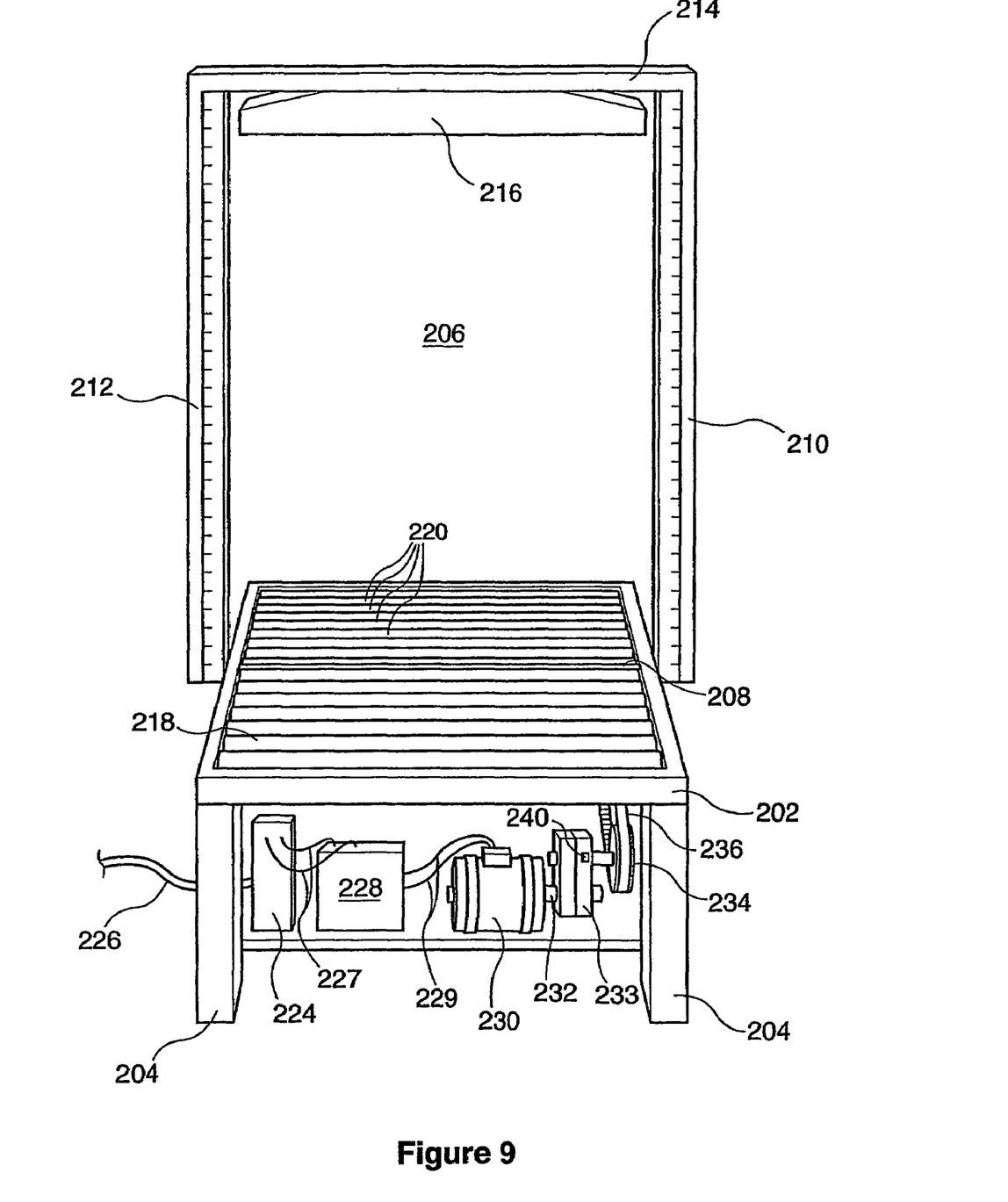
FIG. 9 shows a further embodiment of an automatic cubing system.

FIG. 9 shows a further embodiment of the present invention. In this embodiment the need for position arm 90 and stop arm 80 is eliminated, providing for continuous automatic in-line cubing of packages. The sizing system 200 is shown in end view. The sizing system 200 includes a conveyor table 202 with legs 204. A measuring plane 206 is defined by a width measuring bar 208 integrated and extending across the table 202 as well as a pair of upright measurement arms 210 and 212. Completing the measurement plane 213 is a top rail 214, from which is preferably supported a light source 216 directed downwardly towards the width measuring bar 208.

The table 202 includes a top surface 218 which is in the form of a conveyor. In the preferred embodiment this is in the form of a plurality of rollers 220. Most preferably the rollers are motorized or driven so that any object placed on the rollers is moved from one end of the table to the other end, and in the process passes through the measuring plane defined by the measuring bar 208 and the upright measuring arms 210 and 212. As in the previous embodiment, the measuring bar 208 is preferably just below the top of the rollers 220 in a close but non-contact position.

According to a preferred form of the present invention, the conveyor table 202 preferably includes an associated drive mechanism for powering the rollers, indicated generally at 222. The drive mechanism 222 includes an electrical junction box 224 into which a power cable 226 is secured. Next, wires 227 are connected to a power controller 228 which acts to control power fluctuations that might be present in the incoming power. From the power controller 228 there are wires 229 connected to an electric motor 230. The motor 230 includes an output shaft 232 which is connected to a gear box 233. The gear box provides the desired appropriate gear reduction to obtain the speed to drive pulley 234. A toothed drive belt 236 extends between the pulley 234 and one of the rollers 220. The other rollers are preferably mechanically connected, for example through toothed drive belts, and thus are operatively driven by the motor 230.

It can now be understood that the drive mechanism of the present invention is configured to provide a consistent and known drive speed to the drive rollers, without too much variation. It will be understood that the use of a power conditioner is one way to achieve this result, but that there are many other electro-mechanical devices to achieve the same results. What is important to the present invention is to include in the drive mechanism a reasonably steady drive speed for the rollers, so that the rollers are rotating with a regular and predictable speed, because the more true and accurate the roller speed, the more accurate the measurement by the device as will be understood in more detail below.

While it is possible to set the drive mechanism to a predetermined set speed, it is also preferred according to the present invention to provide a way of monitoring the speed at any instant. To this end a speed sensor 240 is provided which takes a real time measurement of the speed of the motor for the purpose of the measurement "cubing" calculation. The use of a real time speed sensor 240 improves the accuracy of the present invention and thus is most preferred. However, in some instances it may be possible to set the motor speed so accurately that a speed sensor 240 is not required. However, this is less preferred. The speed sensor 240 may be located at any point in the power train, but it has been found convenient to place the same on the motor 230 as shown. The speed sensor 240 provides an output which electrically communicates with the microprocessor.

Figure 10:
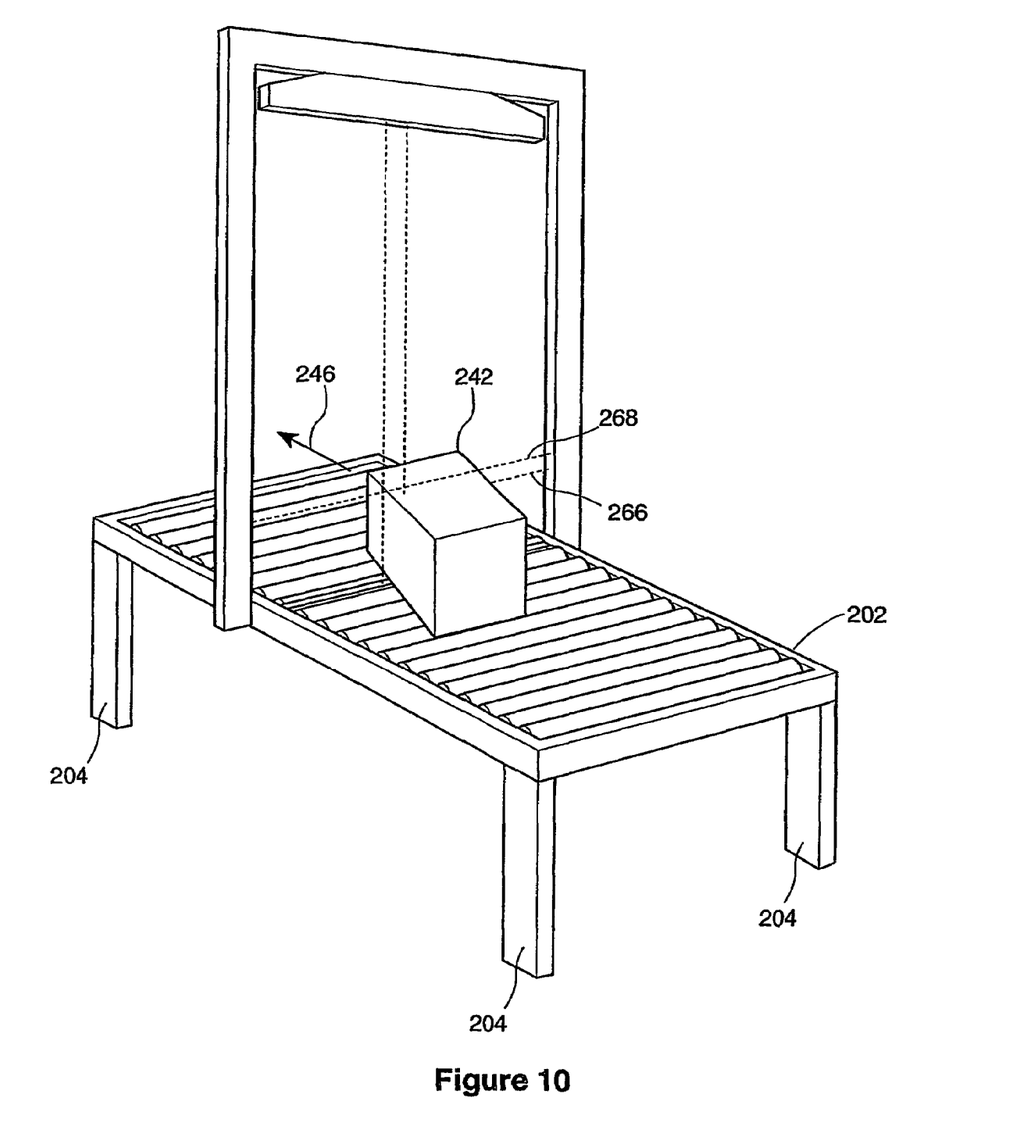
FIG. 10 shows the automatic cubing system of claim 9 in side view with a package being measured.

In FIG. 10 the conveyor table of FIG. 9 is shown measuring a package 242. The package 242 is being driven by the rollers 220 in the direction of arrow 246. Due to the combination of the power controller and the sensor, the speed of the package will be known at every instant as the package 242 passes through the measuring plane 213. The microprocessor will have a sampling rate for getting information from each sensor, many times per second. Thus, the instant that a reading changes can be timed within the limit of the sampling rate. If the rate is, for example, 100 times per second, the time measurements can be accurate to within 1/100 of a second. The operation of the measuring plane 213 can now be understood.

The width bar 208 is the same as the z measurement axis of the previous embodiments and most preferably includes photodetectors 250 at predetermined spaced intervals. The photodetectors 250 detect changes in ambient light, and are thus able to determine when a package 242 has passed over the detector. The overhead light source 216 provides a more reliable level of light than would otherwise be provided by ambient light from the general building services. Thus, while not essential the overhead light 216 is preferred to ensure ease of calibration and greater sensing accuracy. Thus, a package passing over the width bar 208 will block at least one and likely more than one sensor. As the package 242 passes over the width bar senors its presence will be detected and the width of the package 242 passing over the width bar 208 can then be detected. It will be understood that the width bar 208 will measure at any instant in time the distance between the last two unobstructed sensors and in this way, it will not matter where along the width bar the package 242 passes. This means that the package width can be measured without needing to place the package up against an origin.

Figure 11:
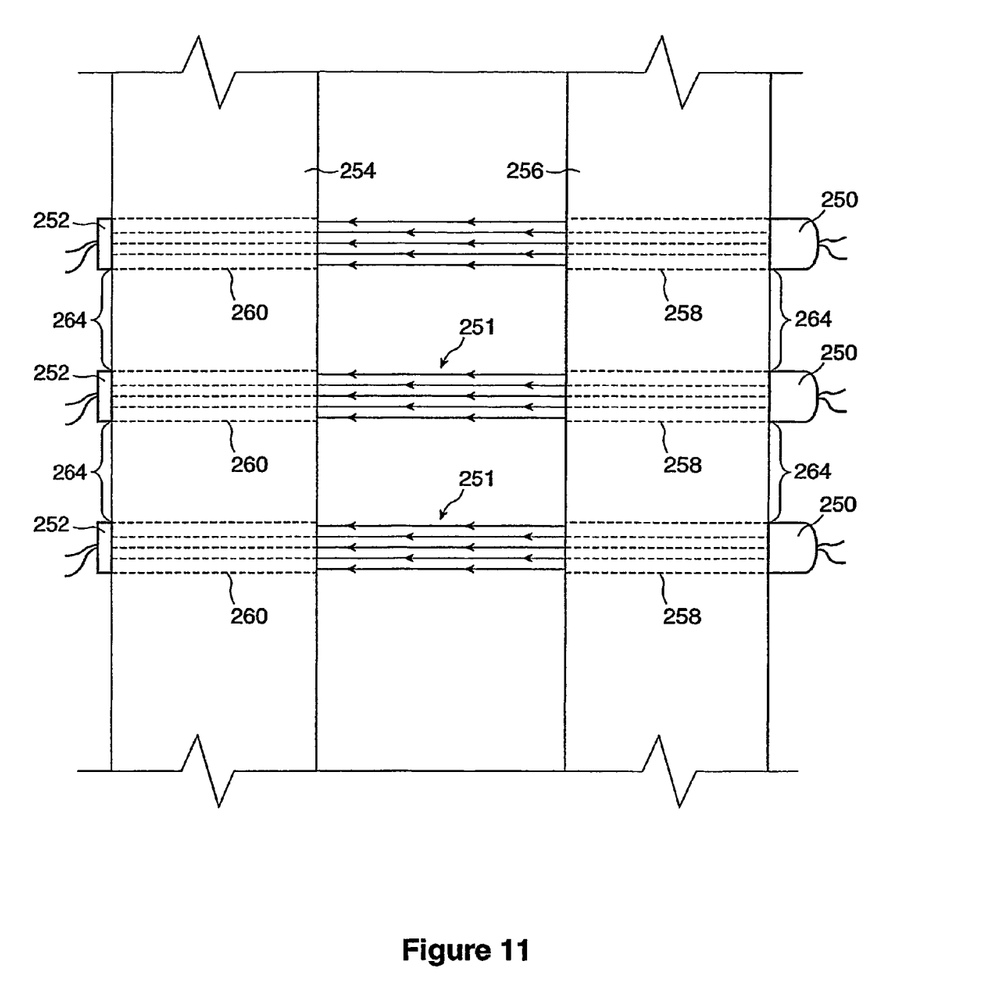
FIG. 11 shows the package height measurement elements in schematic form.

As shown in FIG. 11, the height measurement of the package is determined by a series of photo emitters 250 located on one side 210 of the conveyor table 202 which are directed to produce optical beams 253 which impinge upon photodetectors 252 located on an opposite side 212. Thus for each emitter there is an associated detector. The emitters may be any form of light source, but good results have been achieved with LED emitters. Most preferable the light source will emit a narrow light beam which can be directed onto the detector with little or no dispersion. A collimated light beam is the most preferred form of emission.

To improve the accuracy of the detecting of the present embodiment it is preferred to use input and output light guides 254, 256 as shown in FIG. 11. Essentially the light guides are narrow bores formed in an opaque material, such as plastic. The bores 258 associated with the emitter (the output light guide) causes most of the light to be directed along the axis of the bore, and prevents it from dispersing off of the beam axis. The bores 260 associated with the photodetector (the input light guide) makes the photodetector responsive to the light sources along the input axis only, so changes in light levels off this axis will have little or no effect on the amount of light reaching the photodetectors 252. As well, reflected light, not aligned with the input bore axis, will not be able to reach to photodetector 252, meaning that false readings are much less likely.

It can now be appreciated how the height of the package can be measured. Each photodetector 252 is only responsive to the associated photo emitter 250 and is positioned at a predetermined spaced apart position 264 which is known. Thus, each photodetector 252 is associated with a specific height. Any object passing between the emitter 250 and the detector 252 will cause a significant change in the light signal detected by the photodetector 252, which can then be used to determine a package height. The last occluded detector will reveal the total package height at any give time of a package 242 passing through the measurement plane. This is illustrated in FIG. 10 by beams 266 and 268 one of which passes and one which is blocked by the package 242. In summary the measurement plane detects both the width of a package 242 and the height of a package 242 as it passes through the measurement plane. While the height sensing is shown at the same position as the width sensing, it will be appreciated that these elements could be placed at different positions as long as a package height, length and width are determined.

As will be understood by those skilled in the art, knowing the height and width of a package is not enough. The length of the package is also required for cubing purposes. The present embodiment of the invention make use of the known and/or measured speed of the rollers to determine the speed of the package 242 as it passes through the measurement plane. The speed measurement can be used to calculate the package length in a number of ways. For example, if the package is positioned to be lined up with the direction of travel and the package is a regular shape, the time can be measured between when the package first crosses the width bar to when it is finished crossing the width bar. Knowing the speed of the package and the elapsed time to cross the width bar provides enough information to determine the length of the package, since length will be equal to speed times the elapsed time. However, it will be understood that it will be unlikely, in the absence of a person or device to align the package 242 to the direction of travel, that the package will be aligned. Most often the packages will be crossing the measurement plane somewhat askew. The present invention can still reliably cube the package by conducting various calculations based on the sensor readings as set out more fully below.

Figure 12:
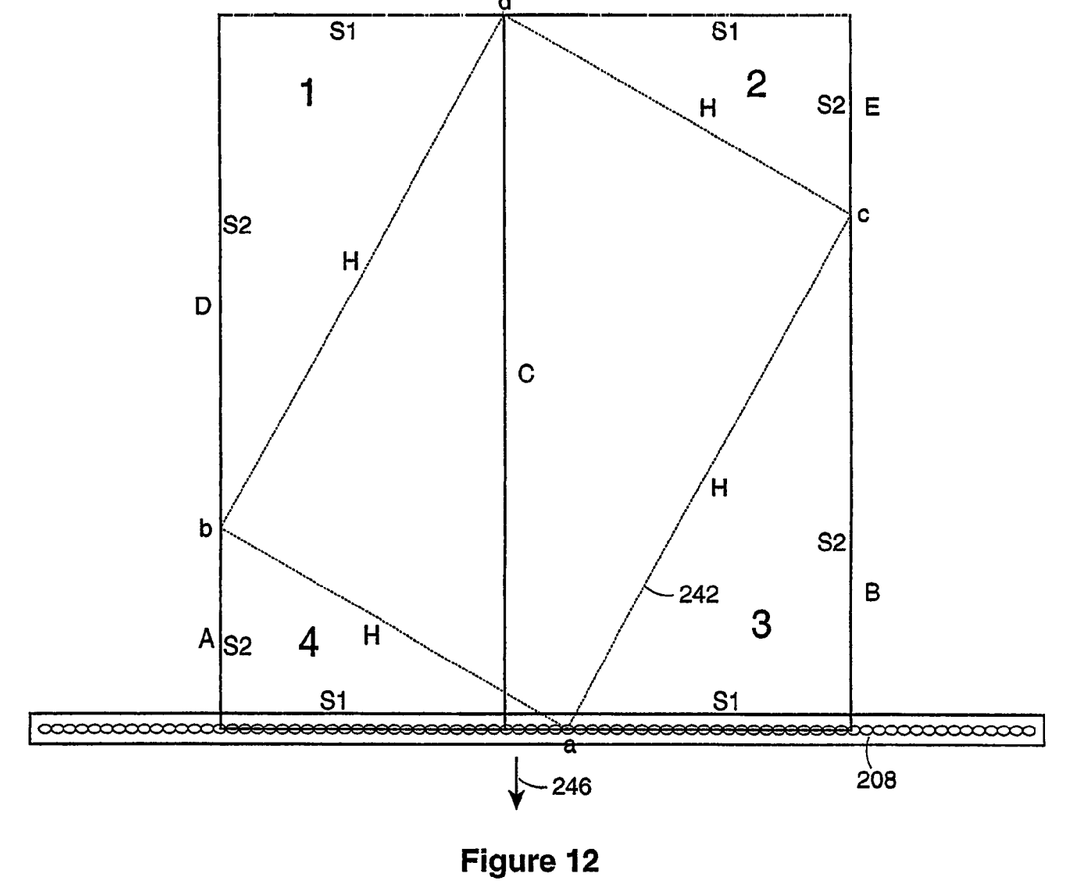
FIG. 12 shows the basis for measuring the area of the package.

Turning now to FIG. 12, a diagram is shown of a package passing over the width bar which is not aligned to the direction of travel. This is a schematic view from above. When a package crosses the measurement bar 208 on an angle relative to the direction of travel 246, the point that first passes over the width bar is recorded and is indicated as "a" in the figure. As the package 242 continues to pass over the width bar 208, the two furthest points from "a" are recorded, together with the time taken to get to these points. These points are shown as points "b", "c" and the elapsed time is used to calculate respectively lengths A and B. Eventually the package will clear the width bar at which time the last point of the package crossing the width bar can be recorded (point "d"). Based on the time point "d" is recorded, an overall diagonal length C can be calculated. This then permits the lengths D and E to be calculated by subtracting A and B from C respectively.

As will be appreciated, the package passing over the width bar will permit the horizontal distance between "a" and "b", and between "a" and "c" to be directly measured. This is shown as S1. As shown the passing of the package across the width bar creates four right angle triangles 1, 2, 3 and 4. In each one, S1 will be a measured value and the other side (A, B, C and D) will be a derived value. Since triangles 1, 2, 3 and 4 are right angle triangles, a hypotenuse H can be calculated for each triangle. This means that for each side of the package (length and width) two measurements are derived since two values of H are found, which permits the two results to be averaged to increase the accuracy of measurement.

It can now be appreciated that the length and width calculations can be combined with the height calculation to cube the package to determine the overall package shipping size. It will be appreciated by those skilled in the art that for non-regular packages, the tallest height will be used, rather than the average height. However, in determining packing space in, for example, air cargo, this is an appropriate measure, since this is the way cargo packing calculations are performed. In other words the present invention measures the package size as accurately as required for the packing methods used in modern packing techniques. As such the present embodiment of the invention provides a mechanically simple yet effective way to calculate the package size for billing and shipping purposes. It will be understood that this embodiment of the invention will include the other aspects of the invention previously taught, such as the associated ID reader, microprocessor weigh scale and billing system algorithm.

The present embodiment can incorporate the weigh scale as part of the weigh table and use an averaging method or other statistical methods to remove inaccuracies that might arise from the fact that the packages are moving. However, the use of a downstream or upstream weigh station is also comprehended. In some cases it may be preferred to use two weigh scales in parallel to ensure that only one package is being weighed at a time and to permit the packages to be stopped momentarily during weighing. The present invention also comprehends that the weight of the packages could be determined at some other part of the sorting process, and the weight information is simply electronically communicated to the microprocessor and then associated with the package ID in the billing records.

It will be understood by those skilled in the art that while reference has been made to preferred embodiments of the present invention, the form of the present invention can vary without departing from the scope of the claims which are attached. Some of these variations have been discussed above and others will be apparent to those skilled in the art. For example, various forms of reader can be used to associate the unique package identifier with the package being measured.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The embodiments of the invention in which an exclusive property or privilege is claimed are defined as follows:

1. A billing system for determining transportation charges for a package movable along a conveyor, said billing system comprising:
    a microprocessor;
    a reader to read a package identifier associated with said package, said reader generating a package identification signal and transmitting the signal to the microprocessor; and
    a package sizer to measure a size of said package, the package sizer having a plurality of spaced non-contact optical sensors being positioned on at least an y and a, z axis for measuring a height and a width of a package, and a means for measuring a length of said package, said width being determined by the package blocking one or more of said sensors positioned along said z axis to create a reduction in the amount of ambient light reaching said one or more sensors and by at least one of said sensors positioned alone said z axis sensing said reduction, said means for measuring a length of said package comprising an apparatus to measure a speed of the package and a length of time the package takes to pass by the optical sensors;
    the microprocessor being configured to receive and correlate said package identification signal and said package size for billing purposes, said microprocessor including a data table for billing charges based on package sizes, the microprocessor further being configured to calculate a length of said package based on said speed and time measurements, whereby said measured package size can be compared to said data table to determine a transportation charge for said measured package.

2. A billing system as claimed in claim 1 wherein said y and z axis sensors define a measurement plane through which said package being measured passes.

3. A billing system as claimed in claim 1 wherein said system measures the time a package takes to pass past said sensors.

4. A billing system as claimed in claim 1 further including a light source located above said z axis sensors.

5. A billing system as claimed in claim 1 further including a weigh scale associated with said sizer, said weigh scale sensing a weight of each of said packages on said sizer and producing a weight signal, wherein said microprocessor receives said weight signal and correlates the same with said package identification signal and said package size signal for billing purposes.

6. A billing system as claimed in claim 1 wherein a dimension of a package is measured by determining the distance between the two most spaced apart sensors which detect the presence of said package.

7. A billing system as claimed in claim 1 further including a motor to drive said conveyor to pass said package past said sensors.

8. A billing system as claimed in claim 7 further including a speed sensor to measure the actual speed of said package as it passes said sensors.

9. A billing system as claimed in claim 2 wherein said sizer further includes optical signal sources directed at said optical sensors along the y axis.

10. A billing system as claimed in claim 9 further including optical input guides to shield said optical sensors from stray light sources.

11. A billing system as claimed in claim 9 further including optical signal guides to direct an optical output from said optical signal sources towards said optical sensors.

12. A method of determining transportation charges for packages by using a billing system having non-contact optical sensors, said method comprising the steps of:
    identifying a package by means of a reader;
    passing the package past sensors located in a y and z axis to measure a height and a width of said package, the width being measured by the sensors on said z axis sensing a reduction in ambient light caused by the package blocking said sensors on said z axis, and measuring a length of said package on an x axis by measuring a speed of said package, and by measuring a length of time said package takes to pass by the optical sensors;

determining a volume of said package from readings from said sensors and said length of said package;

measuring a weight of the package;

correlating the package identifier with said measured weight and volume of said package in a database;

displaying the measured weight and volume; and determining a charge for said package based upon said measured weight and volume upon acceptance of the displayed package parameters.

13. A method of determining transportation charges for a package as claimed in claim 12 wherein said method further includes an initialization step, in which all of the non-contact optical sensors are temporarily energized to permit visual verification of system operation.

14. A method of determining transportation charges for a package as claimed in claim 13 further including the step of checking each optical sensor upon start up and detecting any faults therein.

15. A method of determining transportation charges for a package as claimed in claim 14 further including the step of displaying an error message upon a fault being detected in an optical sensor.

16. A method of determining transportation charges for a package as claimed in claim 15 further including the step of identifying a location of said detected fault and displaying said location of said detected fault.

* * * * *